(12) United States Patent
Chao

(10) Patent No.: US 10,085,271 B2
(45) Date of Patent: Sep. 25, 2018

(54) SYSTEM FOR DETECTING INTERFERENCE SOURCES AND METHOD FOR DETECTING INTERFERENCE SOURCES

(71) Applicant: AMBIT MICROSYSTEMS (SHANGHAI) LTD., Shanghai (CN)

(72) Inventor: Yen-Cheng Chao, New Taipei (TW)

(73) Assignee: AMBIT MICROSYSTEMS (SHANGHAI) LTD., Shanghai (CN)

( * ) Notice: Subject to any disclaimer, the term of this patent is extended or adjusted under 35 U.S.C. 154(b) by 80 days.

(21) Appl. No.: 15/372,408

(22) Filed: Dec. 8, 2016

(65) Prior Publication Data
US 2018/0042027 A1 Feb. 8, 2018

(30) Foreign Application Priority Data
Aug. 6, 2016 (TW) .............................. 105125081 A

(51) Int. Cl.
| | |
|---|---|
| H04W 72/08 | (2009.01) |
| H04W 72/04 | (2009.01) |
| H04W 88/08 | (2009.01) |
| H04W 88/02 | (2009.01) |
| H04W 84/12 | (2009.01) |

(52) U.S. Cl.
CPC ..... H04W 72/082 (2013.01); H04W 72/0473 (2013.01); *H04W 84/12* (2013.01); *H04W 88/02* (2013.01); *H04W 88/08* (2013.01)

(58) Field of Classification Search
CPC .......... H04W 72/082; H04W 72/0473; H04W 84/12; H04W 88/02; H04W 88/08
See application file for complete search history.

(56) References Cited

U.S. PATENT DOCUMENTS

| | | | |
|---|---|---|---|
| 8,229,368 B1 | 7/2012 | Immendorf et al. | |
| 2004/0259589 A1* | 12/2004 | Bahl | H04W 16/14 455/553.1 |
| 2006/0046709 A1 | 3/2006 | Krumm et al. | |
| 2006/0153081 A1 | 7/2006 | Simonsson et al. | |
| 2009/0097445 A1* | 4/2009 | Moelker | H04W 16/14 370/329 |
| 2010/0037124 A1* | 2/2010 | Hoshi | H04L 1/0002 714/799 |
| 2011/0188544 A1* | 8/2011 | Ponnuswamy | H04B 1/713 375/136 |
| 2012/0002536 A1* | 1/2012 | Bellur | H04L 45/02 370/217 |
| 2013/0200882 A1* | 8/2013 | Almalki | G01R 33/0035 324/202 |
| 2016/0066148 A1 | 3/2016 | Schwartz et al. | |

* cited by examiner

*Primary Examiner* — Brian D Nguyen
(74) *Attorney, Agent, or Firm* — ScienBiziP, P.C.

(57) ABSTRACT

A method for detecting a source of interference creates a sorting table according to distances between station devices and an access point (AP) device, and the created sorting table is sent to the AP device. The AP device determines upon a target device from the sorting table and controls the target device to acquire status and distance information between target device and AP device and send the information to the AP device. A value ε is computed according to the information sent by the target device and the calculated value ε is compared with a preset value k. The source of an interference, which affects the signal sent by the AP device, is calculated based on the comparison, and the AP device applies appropriate de-noising to the signal according to the determined interference source.

20 Claims, 8 Drawing Sheets

|                      | First signal throughput range | ⋯   | ⋯   | Nth signal throughput range |
| -------------------- | ----------------------------- | --- | --- | --------------------------- |
| First distance range | a11                           | a12 | a13 | ⋯ a1n                       |
| Second distance range| a21                           | a22 | a23 | ⋯ a2n                       |
| ⋯                    | ⋯                             | ⋯   | ⋯   | ⋯  ⋯                        |
| Mth distance range   | am1                           | am2 | am3 | ⋯ amn                       |

Fig. 6

|  | First signal throughput range | ... | ... | Nth signal throughput range |
|---|---|---|---|---|
| First distance range | b11 | b12 | b13 ... | b1n |
| Second distance range | b21 | b22 | b23 ... | b2n |
| ... | ... | ... | ... ... | ... |
| Mth distance range | bm1 | bm2 | bm3 ... | bmn |

Fig. 7

SYSTEM FOR DETECTING INTERFERENCE SOURCES AND METHOD FOR DETECTING INTERFERENCE SOURCES

CROSS-REFERENCE TO RELATED APPLICATIONS

This application claims priority to Taiwanese Patent Application No. 105125081 filed on Aug. 6, 2016, the contents of which are incorporated by reference herein.

FIELD

The subject matter herein generally relates to wireless communication field, especially relates to system for detecting interference sources and method for detecting interference sources.

BACKGROUND

Nowadays, a signal sent by wireless network device, such as Access Point (AP) device, suffers interference from other nearby wireless devices.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

FIG. 6 is a diagrammatic view of an embodiment of a first matrix.

FIG. 7 is a diagrammatic view of an embodiment of a second matrix.

DETAILED DESCRIPTION

Figure 1:
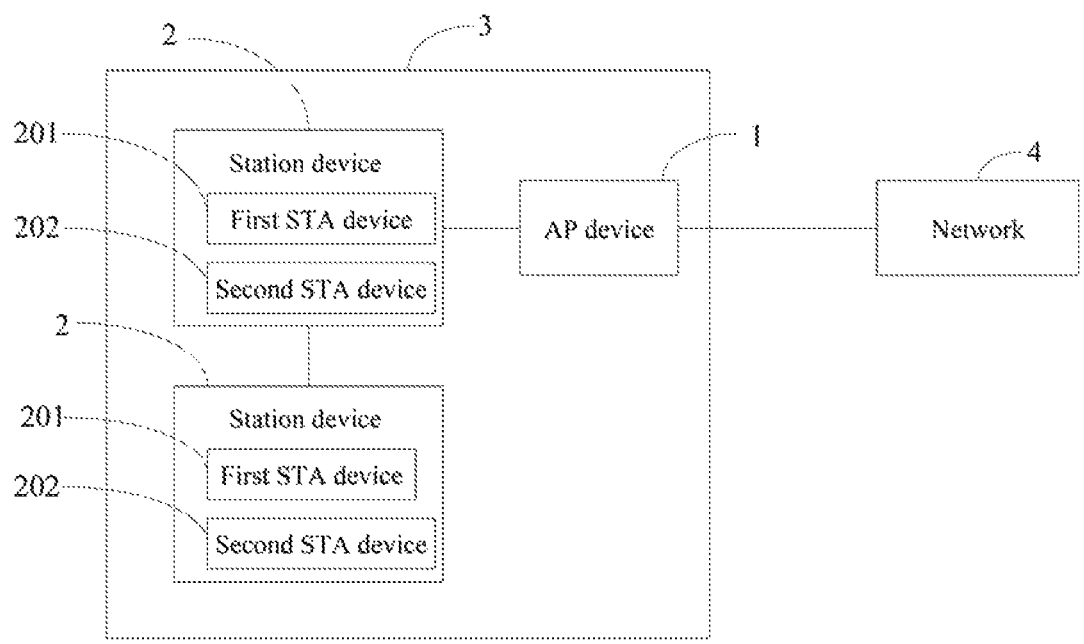
FIG. 1 is a block diagram of an embodiment of a running environment of a system for detecting interference sources.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one."

The term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives. The term "comprising" indicates "including, but not necessarily limited to"; it specifically indicates open-ended inclusion or membership in a so-described combination, group, series, and the like.

FIG. 1 illustrates an embodiment of a running environment of a system 100 for detecting interference sources. The system runs in a network 3 including an access point (AP) device 1 and a number of station (STA) devices 2. In at least one embodiment, the network 3 can be a wireless local area network. The AP device 1 can be a wireless router. The STA device 2 can be a smart phone, a tablet personal computer, a notebook computer, and other suitable electronic device. The AP device 1 communicates with the STA devices 2. The AP device 1 provides wireless access and data access service for the STA devices 2 in the network 3, so that the STA devices 2 can access Internet. In the present embodiment, the STA devices 2 includes a first STA device 201 and a number of second STA devices 202. The system 100 is used to control the AP device 1 to send a first reading request to the first STA device 201. When receiving the first reading request, the first STA device 201 acquires the location information of the second STA devices 202 and sends the location information to the AP device 1. The AP device 1 determines one of the second STA devices 202 as a target device according to the location information of the second STA devices 202 and sends a second reading request to the target device. When receiving the second reading request, the target device sends the state information of the target device to the AP device 1. The AP device 1 analyzes the signal sent by the AP device 1 for any significant interference source. Further, the AP device 1 adjusts the signal to improve the signal transmission quality of the AP device 1 and reduce or eliminate the effect caused by any interference sources detected and determined by the AP device 1.

Figure 2:
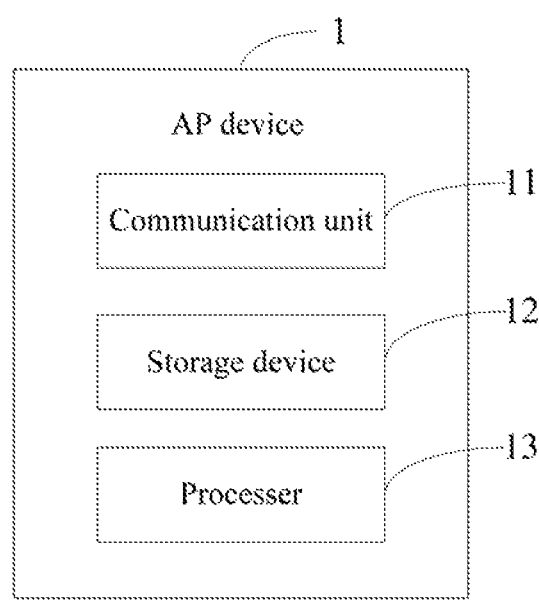
FIG. 2 is a block diagram of an embodiment of an access point device.

FIG. 2 illustrates an embodiment of the AP device 1. The AP device 1 includes, but not limited to a communication unit 11, a storage device 12, and at least one processor 13. The AP device 1 communicates with the STA devices 2 via the communication unit 11. In at least one embodiment, the communication unit 11 is a WI-FI communication module. The storage device 12 stores a first matrix A and a second matrix B. The storage device 12 can include various types of non-transitory computer-readable storage mediums. For example, the storage device 12 can be an internal storage system, such as a flash memory, a random access memory (RAM) for temporary storage of information, and/or a read-only memory (ROM) for permanent storage of information. The storage device 12 can also be an external storage system, such as a hard disk, a storage card, or a data storage medium. The at least one processor 13 can be a central processing unit (CPU), a microprocessor, or other data processor chip.

Figure 3:
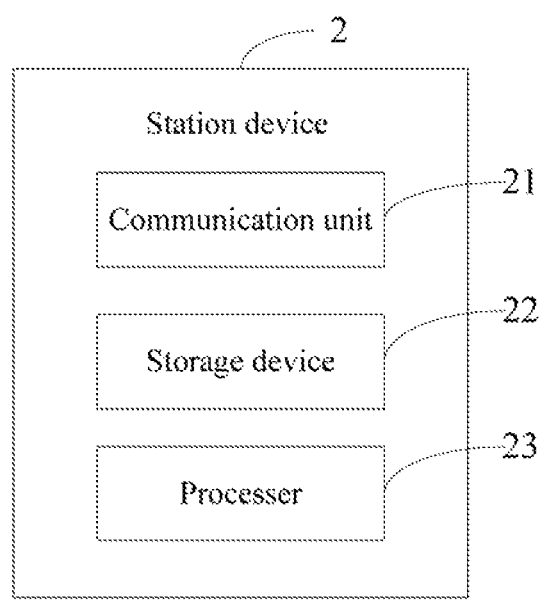
FIG. 3 is a block diagram of an embodiment of an station device.

FIG. 3 illustrates an embodiment of the STA device 2. Each STA device 2 includes a communication unit 21, a storage device 22, and at least one processor 23. In at least one embodiment, the STA device 2 communicates with the AP device 1 via the communication unit 21. The storage device 22 can include various types of non-transitory computer-readable storage mediums. For example, the storage device 22 can be an internal storage system, such as a flash memory, a random access memory (RAM) for temporary storage of information, and/or a read-only memory (ROM) for permanent storage of information. The storage device 22 can also be an external storage system, such as a hard disk, a storage card, or a data storage medium. The at least one processor 23 can be a CPU, a microprocessor, or other data processor chip.

Figure 4:
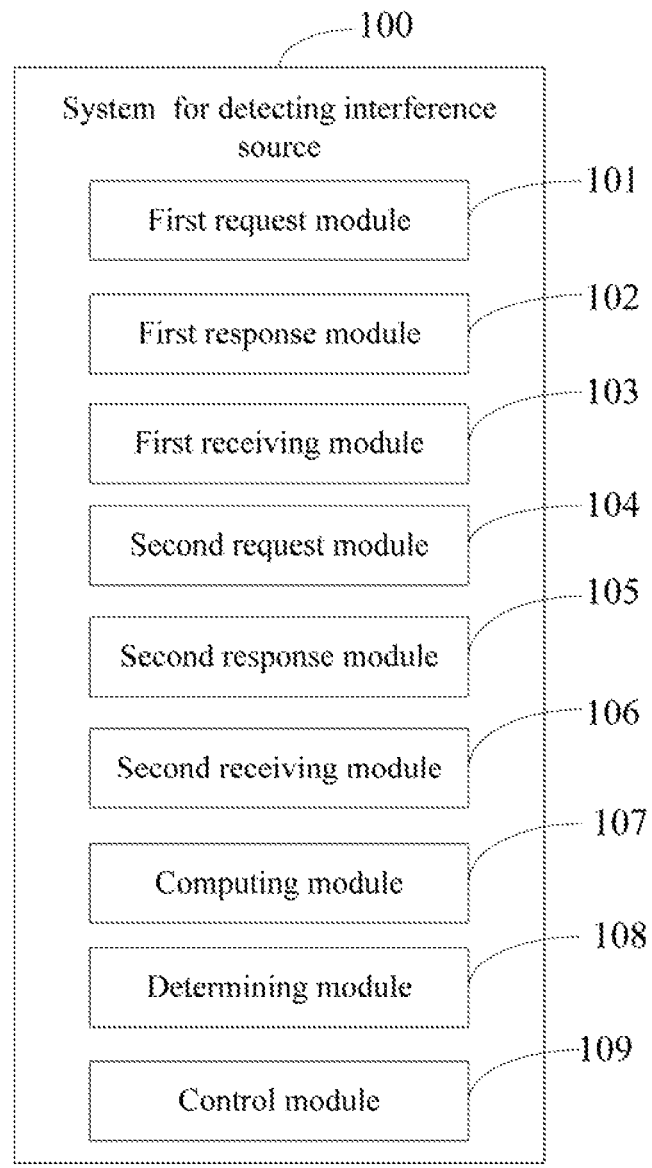
FIG. 4 is a function block diagram of an embodiment of system for detecting interference source.

FIG. 4 illustrates an embodiment of system 100 for detecting interference source. In at least one embodiment, the system 100 can include a first request module 101, a first response module 102, a first receiving module 103, a second request module 104, a second response module 105, a second receiving module 106, a computing module 107, a determining module 108, and a control module 109. The modules 101-109 of the system 100 can be collections of software instructions. In at least one embodiment, the software instructions of the first request module 101, the first receiving module 103, the second request module 104, the second receiving module 106, the computing module 107, the determining module 108, and the control module 109 are stored in the storage device 12 of the AP device 1 and executed by the processor 13 of the AP device 1. The software instructions of the first response module 102 and the second response module 105 are stored in the storage device 23 of the STA device 2 and executed by the processor 23 of the STA device 2.

The first request module 101 is used to control the AP device 1 to send the first reading request to the first STA device 201.

Figure 5:
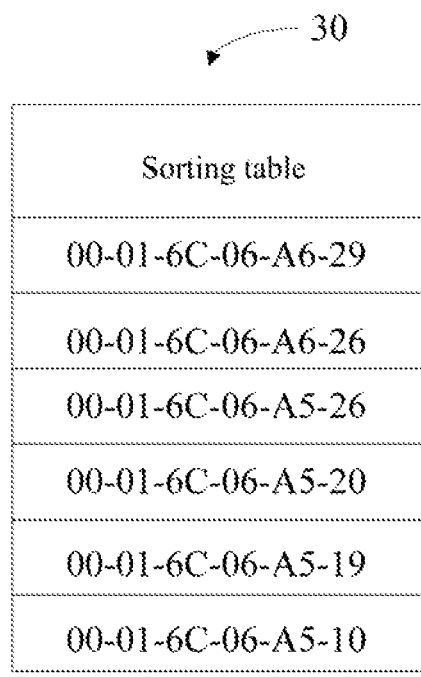
FIG. 5 is a diagrammatic view of an embodiment of a sorting table.

When the first STA device 201 receives the first reading request, the first response module 102 is used to control the first STA device 201 to acquire the state information of the second STA devices 202. The respective distances between the second STA devices 202 and the AP device 1 are analyzed and calculated, and a sorting table 30 is created according to the distance information. The sorting table 30 which is created is sent to the AP device 1. In at least one embodiment, the state information of the second STA devices 202 includes Media Access Control (MAC) information, Received Signal Strength Indicator (RSSI) information and/or Link Quality Indicator (LQI) information. FIG. 5 illustrates an embodiment of the sorting table 30. Each record in the sorting table 30 is a MAC information. Each MAC information corresponds to one second STA device 202. The MAC information in the sorting table 30 is ordered according to the distances between respective second STA devices 202 and the AP device 1, e.g. the closer that one second STA device 202 is to the AP device 1, the higher is the MAC information of the corresponding second STA device 202 which is ranked in the sorting table 30.

In detail, when the first STA device 201 receives the first reading request, the first response module 102 opens Sniffer Mode to detect MAC information, RSSI information and/or LQI information of each second STA device 202 on the network 3. The closer the second STA device 202 is to the AP device 1, the stronger will be the RSSI information and/or the LQI information of the second STA device 202. The first response module 102 thus ranks the second STA devices 202 in the sorting table 30 according to the respective strengths of their RSSI information and/or the LQI information. In the present embodiment, the stronger that the RSSI information and/or the LQI information of the second STA device 202 is (an indication that the distance between the second STA device 202 and the AP device 1 is less), the higher the MAC information ranking of that second STA device 202 in the sorting table 30.

The first receiving module 103 is used to control the AP device 1 to receive the sorting table 30 sent by the first STA device 201.

The second request module 104 is used to control the AP device 1 to determine the target device among the second STA devices 202 in the sorting table 30, and send a second reading request to the determined target device. In one embodiment, the second request module 104 selects the next highest second STA device 202 in the ranking of the sorting table 30 as the target device and sends the second reading request to the target device. In another embodiment, the second request module 104 randomly selects a second STA device 202 in the sorting table 30 as the target device and sends the second reading request to that target device. In other embodiment, the second request module 104 randomly selects two or more second STA devices 202 in the sorting table 30 as the target devices and sends the second reading request to those target devices.

The second response module 105 is used to control the target device to acquire a first distance information between the target device and the AP device 1 and the state information of the target device when the target device receives the second reading request sent by the AP device 1. Further, the second response module 105 sends the first distance information and the state information to the AP device 1.

The second receiving module 106 is used to control the AP device 1 to receive the first distance information and the state information sent by the target device.

The computing module 107 is used to compute a value ε according to the received first distance information and the state information sent by the target device. In detail, the computing module 107 controls the AP device 1 to change the value of the elements of the first matrix A to get a third matrix C according to the first distance information and the state information sent by the target device, and compute the value ε based on a first formula of $$\varepsilon = \sum_{j=1}^{n} \sum_{i=1}^{m} (C \cdot B)_{i,j}.$$

In at least one embodiment, the first matrix A is a preset initial matrix, the second matrix B is an another preset initial matrix, the third matrix C is a changeable matrix from the first matrix A based on the first distance information and the state information. In the embodiment, in the $$\varepsilon = \sum_{j=1}^{n} \sum_{i=1}^{m} (C \cdot B)_{i,j},$$

the B is the second matrix, the C is the third matrix, m is the row variable of the third matrix C, and n is the column variable of the third matrix C. In at least one embodiment, the first matrix A, the second matrix B, and the third matrix C are square matrixes with same dimensions. In at least one embodiment, the first matrix A defines a relationship between a number of signal throughputs T between the AP device 1 and the second STA devices 202 and a number of distance ranges D between the AP device 1 and the second STA devices 202. Referring to FIG. 6, the row variable m of the first matrix A is a distance range variable between the AP device 1 and the second STA devices 202, and the column variable n of the first matrix A is a signal throughput range T between the AP device 1 and the second STA devices 202. The first row of the first matrix A corresponds to a first distance range between the AP device 1 and the second STA devices 202. The second row of the first matrix A corresponds to a second distance range between the AP device 1 and the second STA devices 202. The mth row of the first matrix A corresponds to a mth distance range between the AP device 1 and the second STA devices 202. The first column of the first matrix A corresponds to a first signal throughput range between the AP device 1 and the second STA devices 202, and the second column of the first matrix A corresponds to a second signal throughput range between the AP device 1 and the second STA devices 202. The nth column of the first matrix A corresponds to an nth signal throughput range between the AP device 1 and the second STA devices 202. An element $a_{mn}$ of the first matrix A which has value of 1 indicates that at least one second STA device 202 exists, to make the distance between the AP device 1 and the second STA devices 202 belong to the mth distance range. This value of 1 also indicates that the signal throughput between the AP device 1 and the second STA devices 202 belongs to the nth signal throughput range. An element $a_{mn}$ of the first matrix A which has value of 0 indicates that no second STA device 202 exists to make the distance between the AP device 1 and the second STA devices 202 belong to the mth distance range, and/or make the signal throughput between the AP device 1 and the second STA devices 202 belong to the nth signal throughput range. In at least one embodiment, the first matrix A is a diagonal matrix with six rows and six columns and the first matrix A can be $$\begin{matrix} 1 & 0 & 0 & 0 & 0 & 0 \\ 0 & 1 & 0 & 0 & 0 & 0 \\ 0 & 0 & 1 & 0 & 0 & 0 \\ 0 & 0 & 0 & 1 & 0 & 0 \\ 0 & 0 & 0 & 0 & 1 & 0 \\ 0 & 0 & 0 & 0 & 0 & 1 \end{matrix}.$$

FIG. 7 illustrates an embodiment of the second matrix B. In at least one embodiment, the second matrix B can be a lower triangular matrix of $$\begin{matrix} 1 & 0 & 0 & 0 & 0 & 0 \\ 1 & 1 & 0 & 0 & 0 & 0 \\ 1 & 1 & 1 & 0 & 0 & 0 \\ 1 & 1 & 1 & 1 & 0 & 0 \\ 1 & 1 & 1 & 1 & 1 & 0 \\ 1 & 1 & 1 & 1 & 1 & 1 \end{matrix}.$$

Therein, an element $b_{mn}$ of the first matrix B where a value of 1 indicates that there exists at least one second STA device 202 to make the distance between the AP device 1 and the second STA devices 202 belong to the mth distance range and make the signal throughput between the AP device 1 and the second STA devices 202 belong to the nth signal throughput range. An element $b_{mn}$ of the first matrix A where a value of 0 indicates that there is no second STA device 202 to make the distance between the AP device 1 and the second STA devices 202 belong to the mth distance range and/or make the signal throughput between the AP device 1 and the second STA devices 202 belong to the nth signal throughput range.

The computing module 107 is used to change the value of the elements of the first matrix A to get the third matrix C, based on the first distance information and the state information sent by the target device. In detail, the state information of the target device includes RSSI information. In one embodiment, the RSSI information can be signal throughput information between the target device and the AP device 1. The computing module 107 determines the row which has the changed elements of the first matrix A based on the first distance information sent by the target device and determines the column which has the changed elements of the first matrix A based on the RSSI information sent by the target device. The computing module 107 can thus determine the location of changed elements of the first matrix A. Further, the computing module 107 determines whether the value of the changed element of the first matrix A is 0. When the value of the changed element is 0, the computing module 107 changes the value of the changed element from 0 to 1 in the matrix. When the value of the changed element is 1, the computing module 107 does not change the value of the changed element of the first matrix A. The third matrix C is a matrix created by computing module 107 of the elements with changed values. For example, the computing module 107 can determine that the first distance information sent by the target device belongs to third distance range between the AP device 1 and the target device. The module 107 can also determine that the RSSI information sent by the target device belongs to the second signal throughput range between the AP device 1 and the target device. The computing module 107 thus determines that the changed element of the first matrix A is $a_{32}$, which is located in the third row and the second column of the matrix A. The computing module 107 further determines whether the value of $a_{32}$ is 0. When the value of $a_{32}$ is 0, the computing module 107 changes the value of $a_{32}$ from 0 to 1. When the value of $a_{32}$ is not 0, the computing module 107 does not change the value of $a_{32}$. In other embodiment, the state information of the target device includes RSSI information and LQI information. The computing module 107 applies weighting to the RSSI information and LQI information sent by the target device and computes the signal throughput between the target device and the AP device 1. The computing module 107 determines the location of the changed elements of the first matrix A based on the first distance information sent by the target device and the computed signal throughput. Further, the computing module 107 determines whether the value of the changed element of the first matrix A is 0. When the value of the changed element is 0, the computing module 107 changes the value of $a_{32}$ from 0 to 1, but when the value of changed element is not 0, the computing module 107 does not change the value of the changed element. After applying all values of the changed elements, the computing module 107 determines the third matrix C.

The determining module 108 is used to compare the value ε calculated by the computing module 107 with a preset value k, and determines whether the signal sent by the AP device 1 is being interfered with by an interference source based on the comparison between the value ε and the preset value k. The interference source affecting the signal sent by the AP device 1 is also determined. In at least one embodiment, the preset value k can be calculated according to a second formula $$k = \sum_{j=1}^{n} \sum_{i=1}^{m} (A \cdot B)_{i,j}.$$

In the embodiment, the A is the first matrix, the B is the second matrix, and the m is row variable of the first matrix A and the n is column variable of the second matrix B. When the calculated value ε is more than the preset value k, the determining module 108 determines that the signal sent by the AP device 1 is being interfered with by an interference source. In at least one embodiment, when determining that the signal sent by the AP device 1 is being interfered with by interference source, the determining module 108 acquires the Wi-Fi channel occupied by another second AP device near to the AP device 1. A determination is made as to whether the Wi-Fi channel occupied by the AP device 1 is identical with the Wi-Fi channel occupied by the other second AP device. When the Wi-Fi channel occupied by the AP device 1 is identical with the Wi-Fi channel occupied by the other second AP device, the determining module 108 determines that the interference source as being on the same frequency channel. The determining module 108 further acquires the transmission power of the AP device 1, compares the acquired transmission power of the AP device 1 with a preset power, and determines that the interference source as being a high transmission power interference when the acquired transmission power is more than the preset power. In the present embodiment, the preset power is the transmission power of the AP device 1 when the signal sent by the AP device 1 is not being interfered with. Therein, the preset power is relevant to the first distance information between the target device and the AP device 1. The nearer the target device is to the AP device 1 according to the first distance information, the larger the preset power is.

When the determining module 108 determines that the signal sent by the AP device 1 is not being interfered with on the same frequency channel and there is no high transmission power interference, the determining module 108 determines that the interference source affecting the signal is created by an obstacle.

The control module 109 controls the AP device 1 to do de-noising according to the interference source determined by the determining module 108. In at least one embodiment, when the determining module 108 determines that the interference source is on the same frequency channel, the control module 109 controls the AP device 1 to change the Wi-Fi channel used by the AP device 1 for transmissions. When the determining module 108 determines that the interference source is the obstacle, the control module 109 adjusts the phase of the signal sent by the AP device 1. In at least one embodiment, the control module 109 applies a 90 or 180 degree phase shift to the signal sent by the AP device. When the determining module 108 determines that the interference source is the high transmission power, the control module 109 reduces the transmission power of the AP device 1.

Figure 8:
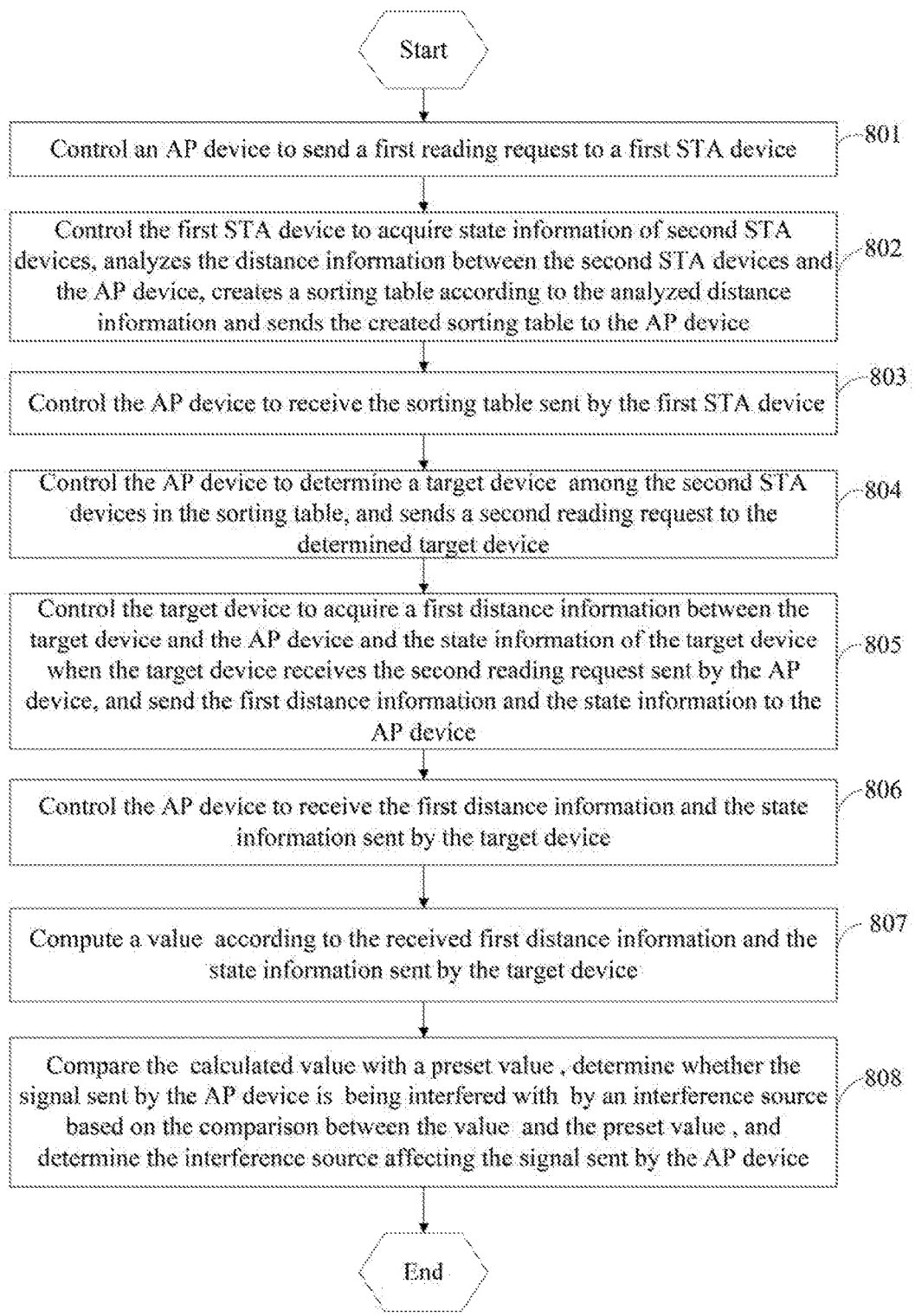
FIG. 8 is a flowchart of an embodiment of a method for detecting interference sources classifying comment record.

FIG. 8 illustrates a flowchart of an embodiment of a method for detecting interference source. The method is provided by way of example, as there are a variety of ways to carry out the method. The method described below can be carried out using the configurations illustrated in FIG. 1-7, for example, and various elements of these figures are referenced in explaining the example method. Each block shown in FIG. 8 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 801.

At block 801, a first request module controls an AP device to send a first reading request to a first STA device.

At block 802, when the first STA device receives the first reading request, a first response module controls the first STA device to acquire state information of second STA devices, analyzes and calculates the distance information between the second STA devices and the AP device, creates a sorting table according to the calculated distance information, and sends the created sorting table to the AP device.

In at least one embodiment, the state information of the second STA device includes MAC information, RSSI information and/or LQI information. Referring to FIG. 5, each record in the sorting table is a MAC information. Each MAC information corresponds to one second STA device. The MAC information in the sorting table is ordered according to the distances between respective second STA devices and the AP device, e.g. the closer that one second STA device is to the AP device, the higher is the MAC information of the corresponding second STA device which is ranked in the sorting table 30.

In detail, when the first STA device receives the first reading request, the first response module opens Sniffer Mode to detect MAC information, RSSI information and/or LQI information of each second STA device on a network. The closer the second STA device is to the AP device, the stronger will be the RSSI information and/or the LQI information of the second STA device is. The first response module thus ranks the second STA devices in the sorting table according to the respective strengths of their RSSI information and/or the LQI information.

At block 803, a first receiving module controls the AP device to receive the sorting table sent by the first STA device.

At block 804, a second request module controls the AP device to determine a target device among the second STA devices in the sorting table, and sends a second reading request to the determined target device.

In one embodiment, the second request module selects the highest second STA device in the ranking of the sorting table as the target device and sends a second reading request to the target device. In another embodiment, the second request module randomly selects a second STA device in the sorting table as the target device and sends the second reading request to the target device. In other embodiment, the second request module randomly selects two or more second STA devices in the sorting table as the target device and sends the second reading request to the target device.

At block 805, a second response module controls the target device to acquire a first distance information between the target device and the AP device and the state information of the target device when the target device receives the second reading request sent by the AP device, and sends the first distance information and the state information to the AP device.

At block 806, a second receiving module controls the AP device to receive the first distance information and the state information sent by the target device.

At block 807, a computing module computes a value ε according to the received first distance information and the state information sent by the target device. In detail, the computing module 107 controls the AP device to change the value of the elements of the first matrix A to get a third matrix C according to the first distance information and the state information sent by the target device, and compute the value ε based on a first formula of $$\varepsilon = \sum_{j=1}^{n}\sum_{i=1}^{m}(C \cdot B)_{i,j}.$$

In at least one embodiment, the first matrix A is a preset initial matrix, the second matrix B is an another preset initial matrix, the third matrix C is a changeable matrix from the first matrix A based on the first distance information and the state information. In the $$\varepsilon = \sum_{j=1}^{n}\sum_{i=1}^{m}(C \cdot B)_{i,j},$$

the B is the second matrix, the C is the third matrix, m is the row variable of the third matrix C, and n is the column variable of the third matrix C.

In at least one embodiment, the first matrix A, the second matrix B, and the third matrix C are square matrixes with same dimension. In at least one embodiment, the matrix A is a preset initial matrix. The first matrix A defines a relationship between a number of signal throughputs T between the AP device and the second STA devices and a number of distance ranges D between the AP device and the second STA devices. Referring to FIG. 6, the row variable m of the first matrix A is a distance range variable between the AP device and the second STA devices, and the column variable n of the first matrix A is a signal throughput range T between the AP device and the second STA devices. The first row of the first matrix A corresponds to a first distance range between the AP device and the second STA devices. The second row of the first matrix A corresponds to a second distance range between the AP device and the second STA devices. The mth row of the first matrix A corresponds to a mth distance range between the AP device and the second STA devices. The first column of the first matrix A corresponds to a first signal throughput range between the AP device and the second STA devices, and the second column of the first matrix A corresponds to a second signal throughput range between the AP device and the second STA devices. The nth column of the first matrix A corresponds to an nth signal throughput range between the AP device and the second STA devices. An element $a_{mn}$ of the first matrix A which has value of 1 indicates that at least one second STA device exists, to make the distance between the AP device and the second STA devices belongs to the mth distance range. This value of 1 also indicates that the signal throughput between the AP device and the second STA devices belongs to the nth signal throughput range. An element $a_{mn}$ of the first matrix A which has value of 0 indicates that no second STA device exists to make the distance between the AP device and the second STA devices belong to the mth distance range and/or make the signal throughput between the AP device and the second STA devices belong to the nth signal throughput range. In at least one embodiment, the first matrix A is a diagonal matrix with six rows and six columns and the first matrix A can be $$\begin{matrix} 1 & 0 & 0 & 0 & 0 & 0 \\ 0 & 1 & 0 & 0 & 0 & 0 \\ 0 & 0 & 1 & 0 & 0 & 0 \\ 0 & 0 & 0 & 1 & 0 & 0 \\ 0 & 0 & 0 & 0 & 1 & 0 \\ 0 & 0 & 0 & 0 & 0 & 1 \end{matrix}.$$

In at least one embodiment, the second matrix B can be a lower triangular matrix of $$\begin{matrix} 1 & 0 & 0 & 0 & 0 & 0 \\ 1 & 1 & 0 & 0 & 0 & 0 \\ 1 & 1 & 1 & 0 & 0 & 0 \\ 1 & 1 & 1 & 1 & 0 & 0 \\ 1 & 1 & 1 & 1 & 1 & 0 \\ 1 & 1 & 1 & 1 & 1 & 1 \end{matrix}.$$

Therein, an element $b_{mn}$ of the first matrix B where a value of 1 indicates that there exists at least one second STA device to make the distance between the AP device and the second STA devices belong to the mth distance range and make the signal throughput between the AP device and the second STA devices belong to the nth signal throughput range. An element $b_{mn}$ of the first matrix A where a value of 0 indicates that there is no second STA device to make the distance between the AP device and the second STA devices belong to the mth distance range and/or make the signal throughput between the AP device and the second STA devices belong to the nth signal throughput range.

The computing module changes the value of the elements of the first matrix A to get the third matrix C, based on the first distance information and the state information sent by the target device. In detail, the state information of the target device includes RSSI information. In one embodiment, the RSSI information can be signal throughput information between the target device and the AP device. The computing module determines the row which has the changed elements of the first matrix A based on the first distance information sent by the target device and determines the column which has the changed elements of the first matrix A based on the RSSI information sent by the target device. The computing module can thus determines the location of the changed elements of the first matrix A. Further, the computing module determines whether the value of the changed element of the first matrix A is 0. When the value of the changed element is 0, the computing module changes the value of the changed element from 0 to 1 in the matrix. When the value of the changed element is 1, the computing module does not change the value the changed element of the first matrix A. The third matrix C is a matrix created by computing module of the elements with changed values.

At block 808, a determining module compares the value ε calculated by the computing module with a preset value k, and determines whether the signal sent by the AP device is being interfered with by an interference source based on the comparison between the value ε and the preset value k, and determines the interference source affecting the signal sent by the AP device. In at least one embodiment, the preset value k can be calculated according to a second formula $$k = \sum_{j=1}^{n} \sum_{i=1}^{m} (A \cdot B)_{i,j}.$$

In the embodiment, the A is the first matrix, the B is the second matrix, the m is row variable of the first matrix A, and the n is column variable of the second matrix B.

When the calculated value ε is more than the preset value k, the determining module determines that the signal sent by the AP device is being interfered with by an interference source. In at least one embodiment, when determining that the signal sent by the AP device is being interfered with by interference source, the determining module acquires the Wi-Fi channel occupied by another second AP device near to the AP device. A determination is made as to whether the Wi-Fi channel occupied by the AP device is identical with the Wi-Fi channel occupied by the other second AP device. When the Wi-Fi channel occupied by the AP device is identical with the Wi-Fi channel occupied by the other second AP device, the determining module determines that the interference source as being on the same frequency channel. The determining module further acquires the transmission power of the AP device, compares the acquired transmission power of the AP device with a preset power, and determines that the interference source as being a high transmission power interference when the acquired transmission power is more than the preset power. In the present embodiment, the preset power is the transmission power of the AP device when the signal sent by the AP device is not being interfered with. Therein, the preset power is relevant to the first distance information between the target device and the AP device. The nearer the target device is to the AP device according to the first distance information between the target device and the AP device, the larger the preset power is.

When the determining module determines that the signal sent by the AP device is not being interfered with on the same frequency channel interference and there is no high transmission power interference, the determining module determines that the interference source affecting the signal is created by an obstacle.

At block 809, a control module controls the AP device do de-noising according to the interference source determined by the determining module.

In at least one embodiment, when the determining module determines the interference source is on the same frequency channel, the control module controls that the AP device to change the Wi-Fi channel used by the AP device for transmission. When the determining module determines that the interference source is the obstacle, the control module adjusts the phase of the signal sent by the AP device. In at least one embodiment, the control module applies a 90 or 180 degree phase shift to make the signal sent by the AP device. When the determining module determines that the interference source is the high transmission power, the control module reduces the transmission power of the AP device.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. A system for detecting interference source, running in a network comprising an Access Point (AP) device and a number of Station (STA) devices, the AP device communicating with the STA devices and providing wireless access and data access service for the STA devices, the STA devices comprising a first STA device and a plurality second STA devices, the system comprising:
   at least one processor; and
   a plurality of modules which are collections of instructions executable by the processor, the plurality of modules comprising:
   a first request module configured to, upon execution by the at least one processor:
      control the AP device to send a first reading request to the first STA device;
   a first response module configured to, upon execution by the at least one processor:
      when the first STA device receives the first reading request, control the first STA device to acquire state information of the second STA devices, analyzes and calculates distance information between the second STA devices and the AP device, creates a sorting table according to the calculated distance information, and sends the created sorting table to the AP device;
   a first receiving module configured to, upon execution by the at least one processor:
      control the AP device to receive the sorting table sent by the first STA device;
   a second request module configured to, upon execution by the at least one processor:
      control the AP device to determine a target device among the second STA devices in the sorting table, and send a second reading request to the determined target device;
   a second response module configured to, upon execution by the at least one processor:
      control the target device to acquire a first distance information between the target device and the AP device and the state information of the target device when the target device receives the second reading request sent by the AP device, and send the first distance information and the state information to the AP device;
   a second receiving module configured to, upon execution by the at least one processor:
      control the AP device to receive the first distance information and the state information sent by the target device;
   a computing module configured to, upon execution by the at least one processor:
      compute a value ε according to the received first distance information and the state information sent by the target device;

a determining module configured to, upon execution by the at least one processor:
compare the value ε calculated by the computing module with a preset value k, determine whether a signal sent by the AP device is being interfered with by an interference source based on the comparison between the value ε and the preset value k, and determine the interference source affecting the signal sent by the AP device; and a control module configured to, upon execution by the at least one processor:
control the AP device do de-noising according to the interference source determined by the determining module.

2. The system according to claim 1, wherein the computing module controls the AP device to change the value of the elements of a first matrix A to get a third matrix C according to the first distance information and the state information sent by the target device, and computes the value ε based on a first formula of $$\varepsilon = \sum_{j=1}^{n} \sum_{i=1}^{m} (C \cdot B)_{i,j},$$

the first matrix A can be $$\begin{matrix} 1 & 0 & 0 & 0 & 0 & 0 \\ 0 & 1 & 0 & 0 & 0 & 0 \\ 0 & 0 & 1 & 0 & 0 & 0 \\ 0 & 0 & 0 & 1 & 0 & 0 \\ 0 & 0 & 0 & 0 & 1 & 0 \\ 0 & 0 & 0 & 0 & 0 & 1 \end{matrix},$$

the second matrix B can be $$\begin{matrix} 1 & 0 & 0 & 0 & 0 & 0 \\ 1 & 1 & 0 & 0 & 0 & 0 \\ 1 & 1 & 1 & 0 & 0 & 0 \\ 1 & 1 & 1 & 1 & 0 & 0 \\ 1 & 1 & 1 & 1 & 1 & 0 \\ 1 & 1 & 1 & 1 & 1 & 1 \end{matrix},$$

the C is the third matrix, m is the row variable of the third matrix C, and n is the column variable of the third matrix C.

3. The system according to claim 2, wherein the first matrix A defines a relationship between a number of signal throughputs T between the AP device and the second STA devices and a number of distance ranges D between the AP device and the second STA devices, an element $a_{mn}$ of the first matrix A which has value of 1 indicates that at least one second STA device exists to make the distance between the AP device and the second STA devices belong to the mth distance range and make the signal throughput between the AP device and the second STA devices belong to nth signal throughput range; an element $a_{mn}$ of the first matrix A which has value of 0 indicates that no second STA device exists to make the distance between the AP device and the second STA devices belong to the mth distance range and/or make the signal throughput between the AP device and the second STA devices belong to the nth signal throughput range.

4. The system according to claim 2, wherein the state information of the target device comprises RSSI information, the computing module further:
determines a row which has the changed elements of the first matrix A based on the first distance information sent by the target device and determines a column which has the changed elements of the first matrix A based on the RSSI information sent by the target device to determine the location of the changed elements of the first matrix A;
determines whether the value of the changed element of the first matrix A is 0;
when the value of the changed element is 0, the computing module changes the value of the changed element from 0 to 1 in the matrix; and
when the value of the changed element is 1, the computing module remains the value of the changed element of the first matrix A the same.

5. The system according to claim 2, wherein the preset value k can be calculated according to a second formula $$k = \sum_{j=1}^{n} \sum_{i=1}^{m} (A \cdot B)_{i,j},$$

the A is the first matrix, the B is the second matrix, and the m is row variable of the first matrix A, and the n is column variable of the second matrix B.

6. The system according to claim 1, wherein when the calculated value ε is more than the preset value k, the determining module determines that the signal sent by the AP device is being interfered with by an interference source.

7. The system according to claim 6, wherein when determining the signal sent by the AP devices is being interfered with by the interference source, the determining module acquires Wi-Fi channel occupied by a second AP device near to the AP device, determines whether the Wi-Fi channel occupied by the AP device is identical with the Wi-Fi channel occupied by the second AP device, when the Wi-Fi channel occupied by the AP device is identical with the Wi-Fi channel occupied by the second AP device, the determining module determines that the interference source as being on the same frequency channel.

8. The system according to claim 7, wherein the determining module further acquires the transmission power of the AP device, compares the acquired transmission power of the AP device with a preset power, and determines that the interference source as being a high transmission power when the acquired transmission power is more than a preset power.

9. The system according to claim 8, wherein when the determining module determines that the signal sent by the AP device is not being interfered with on the same frequency channel and there is no high transmission power interference, the determining module determines that the interference source is created by an obstacle.

10. The system according to claim 9, wherein when the determining module determines that the interference source is on the same frequency channel, the control module controls the AP device to change the Wi-Fi channel used by the AP device for transmission; when the determining module determines that the interference source is the obstacle, the control module adjusts the phase of the signal sent by the AP device; when the determining module determines that the interference source is the high transmission power, the control module reduces the transmission power of the AP device.

11. A method for detecting interference source, runs in a network comprising an AP device and a number of STA devices, the AP device communicating with the STA devices and providing wireless access and data access service for the STA devices, the STA devices comprising a first STA device and a plurality second STA devices, the method comprising:
- controlling the AP device to send a first reading request to the first STA device;
- when the first STA device receives the first reading request, controlling the first STA device to acquire state information of the second STA devices, analyzing and calculating distance information between the second STA devices and the AP device, creating a sorting table according to the distance information, and sending the created sorting table to the AP device;
- controlling the AP device to receive the sorting table sent by the first STA device;
- controlling the AP device to determine a target device among the second STA devices in the sorting table, and send a second reading request to the determined target device;
- controlling the target device to acquire a first distance information between the target device and the AP device and the state information of the target device when the target device receives the second reading request sent by the AP device, and send the first distance information and the state information to the AP device;
- controlling the AP device to receive the first distance information and the state information sent by the target device;
- computing a value ε according to the received first distance information and the state information sent by the target device;
- comparing the calculated value ε with a preset value k, determining whether a signal sent by the AP device is being interfered with by an interference source based on the comparison between the value ε and the preset value k, and determining the interference source affecting the signal sent by the AP device; and
- controlling the AP device do de-noising according to the determined interference source.

12. The method according to claim 11, wherein the method further comprising:
- controlling the AP device to change the value of the elements of a first matrix A to get a third matrix C according to the first distance information and the state information sent by the target device, and computing the value ε based on a first formula of $$\varepsilon = \sum_{j=1}^{n}\sum_{i=1}^{m}(C \cdot B)_{i,j},$$

the first matrix A can be $$\begin{pmatrix} 1 & 0 & 0 & 0 & 0 & 0 \\ 0 & 1 & 0 & 0 & 0 & 0 \\ 0 & 0 & 1 & 0 & 0 & 0 \\ 0 & 0 & 0 & 1 & 0 & 0 \\ 0 & 0 & 0 & 0 & 1 & 0 \\ 0 & 0 & 0 & 0 & 0 & 1 \end{pmatrix},$$

the second matrix B can be $$\begin{pmatrix} 1 & 0 & 0 & 0 & 0 & 0 \\ 1 & 1 & 0 & 0 & 0 & 0 \\ 1 & 1 & 1 & 0 & 0 & 0 \\ 1 & 1 & 1 & 1 & 0 & 0 \\ 1 & 1 & 1 & 1 & 1 & 0 \\ 1 & 1 & 1 & 1 & 1 & 1 \end{pmatrix},$$

the C is the third matrix, m is the row variable of the third matrix C, and n is the column variable of the third matrix C.

13. The method according to claim 12, wherein the first matrix A defines a relationship between a number of signal throughputs T between the AP device and the second STA devices and a number of distance ranges D between the AP device and the second STA devices, an element $a_{mn}$ of the first matrix A which has value of 1 indicates that at least one second STA device exists to make the distance between the AP device and the second STA devices belong to mth distance range and make the signal throughput between the AP device and the second STA devices belong to nth signal throughput range; an element $a_{mn}$ of the first matrix A which has value of 0 indicates that no second STA device exists to make the distance between the AP device and the second STA devices belong to the mth distance range and/or make the signal throughput between the AP device and the second STA devices belong to the nth signal throughput range.

14. The method according to claim 12, wherein the state information of the target device comprises RSSI information, the method further comprises:
- determining a row which has the changed elements of the first matrix A based on the first distance information sent by the target device and determines a column which has the changed elements of the first matrix A based on the RSSI information sent by the target device to determine the location of the changed elements of the first matrix A;
- determining whether the value of the changed element of the first matrix A is 0;
- when the value of the changed element is 0, changing the value of the changed element from 0 to 1; and
- when the value of the changed element is 1, remaining the value of the changed element of the first matrix A the same.

15. The method according to claim 12, wherein the preset value k can be calculated according to a second formula $$k = \sum_{j=1}^{n}\sum_{i=1}^{m}(A \cdot B)_{i,j},$$

the A is the first matrix, the B is the second matrix, and the m is row variable of the first matrix A, and the n is column variable of the second matrix B.

16. The method according to claim 11, wherein the method further comprising:
- when the calculated value ε is more than the preset value k, determining that the signal sent by the AP device is interfered by interference source.

17. The method according to claim 16, wherein the method further comprising:
- when determining the signal sent by the AP devices is being interfered with by the interference source, acquiring Wi-Fi channel occupied by a second AP device near to the AP device, determining whether the Wi-Fi channel occupied by the AP device is identical with the Wi-Fi channel occupied by the second AP device:
when the Wi-Fi channel occupied by the AP device is identical with the Wi-Fi channel occupied by the second AP device, determining that the interference source as being on the same frequency channel.

18. The method according to claim 17, wherein the method further comprising:
acquiring the transmission power of the AP device, comparing the acquired transmission power of the AP device with a preset power, and determining that the interference source as being a high transmission power when the acquired transmission power is more than a preset power.

19. The method according to claim 18, wherein the method further comprising:
when determining that the signal sent by the AP device is not being interfered with on the same frequency channel and there is no high transmission power interference, determining that the interference source is created by an obstacle.

20. The method according to claim 19, wherein the method further comprising:
when determining that the interference source is on the same frequency channel, controlling the AP device to change the Wi-Fi channel used by the AP device for transmission;
when determining that the interference source is the obstacle, adjusting the phase of the signal sent by the AP device; and
when determining that the interference source is the high transmission power, reducing the transmission power of the AP device.

* * * * *